(12) United States Patent
Takemoto (10) Patent No.: US 8,659,797 B2
(45) Date of Patent: Feb. 25, 2014

(54) IMAGE FORMING APPARATUS, COMPUTER READABLE MEDIUM, AND METHOD

(75) Inventor: Fumito Takemoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 860 days.

(21) Appl. No.: 12/801,270

(22) Filed: Jun. 1, 2010

(65) Prior Publication Data

US 2010/0302598 A1  Dec. 2, 2010

(30) Foreign Application Priority Data

Jun. 2, 2009  (JP) ................. 2009-133033

(51) Int. Cl.
*H04N 1/409* (2006.01)
*H04N 1/60* (2006.01)
*G06K 9/40* (2006.01)

(52) U.S. Cl.
USPC .......... 358/3.27; 358/1.9; 358/3.26; 382/266; 382/275

(58) Field of Classification Search
USPC ......... 358/3.27, 1.9, 3.26; 382/284, 294, 266, 382/275; 348/588; 375/E7.086; 235/491, 235/494

See application file for complete search history.

(56) References Cited

U.S. PATENT DOCUMENTS

| 6,075,905 | A  | * | 6/2000 | Herman et al. | 382/284 |
| 6,667,815 | B1 | * | 12/2003 | Nagao | 358/1.9 |
| 7,044,386 | B2 | * | 5/2006 | Berson | 235/491 |

FOREIGN PATENT DOCUMENTS

JP  2008-244831 A  10/2008

* cited by examiner

*Primary Examiner* — Charlotte M Baker
(74) *Attorney, Agent, or Firm* — Jean C. Edwards; Edwards Neils PLLC (57) ABSTRACT

There are provided an image forming apparatus, a program, and a method to easily form a three-dimensional image at a reduced cost.
Such an image forming apparatus includes an image obtaining section that obtains a source image, a region identifying section that identifies a region, in the source image, that is to be subjected to sharpness enhancement, and an image forming section that forms an image whose region corresponding to the region identified by the region identifying section is raised. Being saved from the process of measuring the distances to the subjects, the image forming apparatus can be constituted without a distance measuring sensor and the like, thereby reducing the cost. Furthermore, the image forming apparatus can easily form a three-dimensional image.

8 Claims, 5 Drawing Sheets

IMAGE FORMING APPARATUS, COMPUTER READABLE MEDIUM, AND METHOD

CROSS REFERENCE TO RELATED APPLICATION

The contents of the following Japanese patent application is incorporated herein by reference, No. 2009-133033 filed on Jun. 2, 2009.

BACKGROUND

1. Technical Field

The present invention relates to an image forming apparatus, a computer readable medium, and a method.

2. Related Art

Japanese Patent Application Publication No. 11-344777 discloses a technique of calculating the distances to the subjects for each of the regions of an image, reducing depth information of each region at a specific ratio that is determined in such a manner that the reducing ratio increases as the distances to the subjects increase, and forming protrusions and depressions in each region of a printed image based on the reduced depth information. Japanese Patent Application Publication No. 07-287326 discloses a technique of raising each of the subjects shown in a printed image to a height determined according to the distance to the corresponding subject.

Both of the techniques disclosed in the above-mentioned patent documents require the distances to the subjects to be measured for the respective regions of an image, and protrusions and depressions are formed in all of the regions based on the measured distances to the subjects. Therefore, the techniques disadvantageously incur high cost and high processing load.

SUMMARY

According to the first aspect related to the innovations herein, one exemplary image forming apparatus may include an image obtaining section that obtains a source image, a region identifying section that identifies a region, in the source image, that is to be subjected to sharpness enhancement, and an image forming section that forms an image whose region corresponding to the region identified by the region identifying section is raised.

The image forming section may print the image on a printing medium in such a manner that a region of the printing medium corresponding to the region identified by the region identifying section is raised.

The image forming apparatus may further include a degree determining section that determines a degree of the sharpness enhancement to be performed on the region identified by the region identifying section, and a height determining section that determines a height to which the region of the printing medium corresponding to the region identified by the region identifying section is raised, in accordance with the degree determined by the degree determining section. Here, the image forming section may print the image on the printing medium in such a manner that the region corresponding to the identified region is raised to the height determined by the height determining section.

The region identifying section may identify, in the source image, a region that is to be subjected to the sharpness enhancement, gray level enhancement, and color saturation enhancement, the degree determining section may determine respective degrees of the sharpness enhancement, the gray level enhancement, and the color saturation enhancement that are to be performed on the region identified by the region identifying section, and the height determining section may determine a height to which the region of the printing medium corresponding to the region identified by the region identifying section is raised, by adding together heights associated with the respective degrees of the sharpness enhancement, the gray level enhancement, and the color saturation enhancement determined by the degree determining section.

The height determining section may determine the height to which the region of the printing medium corresponding to the region identified by the region identifying section is raised, by adding together weighted values of the heights associated with the degrees of the sharpness enhancement, the gray level enhancement, and the color saturation enhancement determined by the degree determining section.

The height determining section may increase the height as the degree determined by the degree determining section increases.

The image forming section may first process the printing medium such that the region of the printing medium corresponding to the region identified by the region identifying section is raised and thereafter print the image onto the printing medium.

The image forming section may adjust an amount of ink while printing the image on the printing medium so that the region of the printing medium corresponding to the region identified by the region identifying section is raised by the ink.

The image forming section may first print the image on a printing medium and then apply a pressure to a region of the printing medium corresponding to the region identified by the region identifying section to raise the corresponding region of the printing medium.

The image forming section may print the image on the printing medium by using a foam ink in such a manner that the region of the printing medium corresponding to the region identified by the region identifying section is raised.

The image forming section may generate, from the source image, parallax image data that enables a viewer to view the image whose region corresponding to the region identified by the region identifying section is raised, and output the parallax image data.

According to the second aspect related to the innovations herein, one exemplary computer readable medium may store thereon a program which when executed causes a computer to function as an image obtaining section that obtains a source image, a region identifying section that identifies a region, in the source image, that is to be subjected to sharpness enhancement, and an image forming section that forms an image whose region corresponding to the region identified by the region identifying section is raised.

According to the third aspect related to the innovations herein, one exemplary method of forming an image by a computer may include obtaining a source image, identifying, in the source image, a region to be subjected to sharpness enhancement, and forming the image whose region corresponding to the identified region is raised.

The summary clause does not necessarily describe all necessary features of the embodiments of the present invention. The present invention may also be a subcombination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
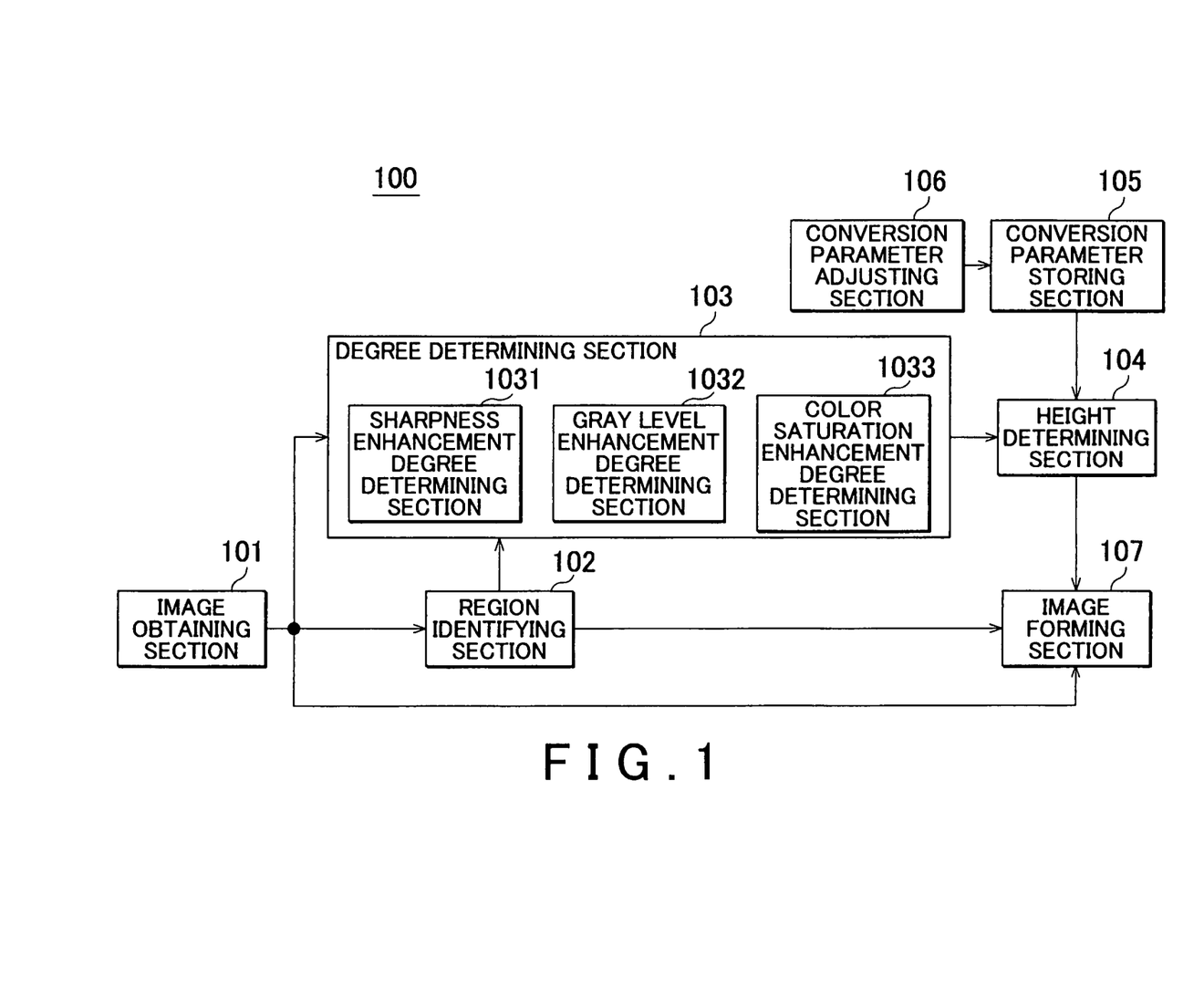
FIG. 1 illustrates an image forming apparatus 100 relating to an embodiment of the present invention.

FIG. 1 illustrates an image forming apparatus 100 relating to an embodiment of the present invention. The image forming apparatus 100 includes an image obtaining section 101, a region identifying section 102, a degree determining section 103, a height determining section 104, a conversion parameter storing section 105, a conversion parameter adjusting section 106, and an image forming section 107.

The image obtaining section 101 obtains image data captured by a digital camera, image data downloaded via the Internet, or other image data. The image obtaining section 101 may obtain image data by means of wired communication from different devices via USB cables or LAN cables, or by means of wireless communication such as infrared communication or wireless LAN communication. The image obtaining section 101 outputs the obtained image data to the region identifying section 102, the degree determining section 103, and the image forming section 107.

The region identifying section 102 identifies a region, in the image data supplied thereto, that is to be subjected to be image processing including at least one of sharpness enhancement, gray level enhancement, and color saturation enhancement. In other words, the region identifying section 102 identifies a region that is to be enhanced by image processing including at least one of sharpness enhancement, gray level enhancement, and color saturation enhancement. It may be freely selected by a user which types of enhancement are to be performed on the image data. Alternatively, the region identifying section 102 may identify separate regions that are respectively to be subjected to the sharpness enhancement, the gray level enhancement, and the color saturation enhancement. The region identifying section 102 may identify a region to be subjected to the image processing automatically or in accordance with the user's designation. The region identifying section 102 outputs the identified region to the degree determining section 103 and the image forming section 107. Here, the region identifying section 102 may automatically identify the region to be subjected to the image processing by means of a technique that can be appropriately designed and applied by the person skilled in the art.

The degree determining section 103 determines the degree of the image processing to be performed on the region identified by the region identifying section 102. When the region identifying section 102 identifies separate regions that are respectively to be subjected to the sharpness enhancement, the gray level enhancement, and the color saturation enhancement, the degree determining section 103 respectively determines the degrees of the sharpness enhancement, the gray level enhancement, and the color saturation enhancement to be performed on the regions identified by the region identifying section 102. The degree determining section 103 outputs, to the height determining section 104, the degree of the image processing to be performed on the region identified by the region identifying section 102.

The degree determining section 103 includes a sharpness enhancement degree determining section 1031, a gray level enhancement degree determining section 1032, and a color saturation enhancement degree determining section 1033. When the region identifying section 102 identifies a region to be subjected to the sharpness enhancement, the sharpness enhancement degree determining section 1031 determines the degree of the sharpness enhancement to be performed on the identified region. When the region identifying section 102 identifies a region to be subjected to the gray level enhancement, the gray level enhancement degree determining section 1032 determines the degree of the gray level enhancement to be performed on the identified region. When the region identifying section 102 identifies a region to be subjected to the color saturation enhancement, the color saturation enhancement degree determining section 1033 determines the degree of the color saturation enhancement to be performed on the identified region.

The sharpness enhancement degree determining section 1031, the gray level enhancement degree determining section 1032, and the color saturation enhancement degree determining section 1033 may determine the degrees automatically or in accordance with the user's designations. The gray level enhancement degree determining section 1032 may determine the degree of the gray level enhancement with reference to a gray level conversion curve that is designated in advance or by the user. The gray level curve indicates a relation between the gray level of input image data and the gray level of output image data that results from the gray level enhancement, and is a gamma curve, for example. In general, the gray level curve is designed such that a middle-level gray level in the input image data is most significantly enhanced and low-level and high-level densities are less significantly enhanced. The sharpness enhancement degree determining section 1031 may output, to the height determining section 104, the determined degree for the sharpness enhancement. The gray level enhancement degree determining section 1032 may output, to the height determining section 104, the determined degree for the gray level enhancement. The color saturation enhancement degree determining section 1033 may output, to the height determining section 104, the determined degree for the color saturation enhancement. The region identifying section 102 and the degree determining section 103 may automatically determine the region to be subjected to the image processing and the degree of the image processing so that the image processing is performed, by utilizing techniques that can be appropriately designed and applied by the person skilled in the art, and thus can determine the region to be subjected to the image processing and the degree of the image processing to be performed to the region with the help of such techniques. It should be noted here that the term "degree" means the degree of enhancement. Specifically speaking, the term "degree" indicates a difference between a pre-enhancement value and a post-enhancement value, stated differently, a value by which an original value changes by the enhancement. Alternatively, the term "degree" may mean the ratio between the pre-enhancement value and the post-enhancement value.

The height determining section 104 determines the height to which the region identified by the region identifying section 102 is raised, according to the degree determined by the degree determining section 103. The height determining section 104 may determine the height to which the region identified by the region identifying section 102 is raised, by appropriately weighting the height associated with the degree determined by the degree determining section 103. The height determining section 104 may determine the height by differently weighting the height associated with the degree of the enhancement determined by the degree determining section 103, depending on the type of the enhancement. Stated differently, the height determining section 104 may assign different weights to the height associated with the degree determined by the sharpness enhancement degree determining section 1031, the height associated with the degree determined by the gray level enhancement degree determining section 1032, and the height associated with the degree determined by the color saturation enhancement degree determining section 1033. For example, the height determining section 104 can assign the greatest weight to the height associated with the degree determined by the sharpness enhancement degree determining section 1031. The height determining section 104 varies the height associated with the degree of each type of enhancement, based on a predetermined weight assigned to the corresponding type of enhancement. Stated differently, on reception of the same degree, the height determining section 104 determines different heights according to the types of the enhancement.

When the regions identified by the region identifying section 102 include a given region that is to be subjected to two or more of the sharpness enhancement, the gray level enhancement, and the color saturation enhancement, the height determining section 104 may determine the height to which each of the regions identified by the region identifying section 102 is raised, by adding together the heights associated with the degrees of the two or more types of enhancement determined for the given region by the degree determining section 103, or by adding together the weighted values of the heights associated with the degrees of the two or more types of enhancement. Alternatively, when the regions identified by the region identifying section 102 include a given region that is to be subjected to two or more of the sharpness enhancement, the gray level enhancement, and the color saturation enhancement, the height determining section 104 may determine the height to which the identified regions are raised, by calculating an average among the heights associated with the degrees of the two or more types of enhancement determined for the given region by the degree determining section 103, or by calculating an average among the weighted values of the heights associated with the degrees of the two or more types of the enhancement. Alternatively, when the regions identified by the region identifying section 102 include a given region that is to be subjected to two or more of the sharpness enhancement, the gray level enhancement, and the color saturation enhancement, the height determining section 104 may select, as the height to which the identified regions are raised, one of the heights associated with the degrees of the two or more of the enhancement or one of the weighted values of the heights.

The degree of particular enhancement to be performed on various regions may vary depending on the regions. For example, the degree of the sharpness enhancement to be performed on various regions may vary depending on the regions. If such is the case, the degree of the same enhancement to be performed on various regions differs between the regions, and the height determining section 104 may determine different heights for different regions.

The conversion parameter storing section 105 stores thereon heights in association with the degrees of each type of enhancement. The conversion parameter storing section 105 stores thereon weighted values of the heights associated with the degrees of each type of enhancement. Thus, the height determining section 104 can determine the weighted height associated with the degree of each type of enhancement determined by the degree determining section 103, by simply obtaining from the conversion parameter storing section 105 the height associated with the determined degree of each type of enhancement.

The conversion parameter adjusting section 106 adjusts the heights stored in the conversion parameter storing section 105 in association with the degrees of each type of enhancement. Thus, the conversion parameter adjusting section 106 can change the weights assigned to the degrees of each type of enhancement. Specifically speaking, the conversion parameter adjusting section 106 decreases a weight assigned to a certain degree by decreasing the height associated with the certain degree, and increases the weight assigned to the certain degree by increasing the height associated with the certain degree. The conversion parameter adjusting section 106 may adjust the heights associated with the degrees of each type of enhancement stored on the conversion parameter storing section 105, in accordance with the user's manipulation or automatically.

The image forming section 107 forms an image whose region corresponding to the region identified by the region identifying section 102 is raised, based on the image data obtained by the image obtaining section 101. Specifically speaking, the image forming section 107 prints the image data obtained by the image obtaining section 101 onto a printing medium in such a manner that a region of the printing medium corresponding to the region identified by the region identifying section 102 is raised. The image forming section 107 may print the image data onto the printing medium in such a manner that the region of the printing medium corresponding to the region identified by the region identifying section 102 is raised to the height determined by the height determining section 104. The image forming section 107 may first process a printing medium such that its region corresponding to the region identified by the region identifying section 102 is raised and then print the image data onto the processed printing medium. Alternatively, the image forming section 107 may adjust the amount of an ink while printing an image onto the surface of a printing medium such that a region of the printing medium corresponding to the region identified by the region identifying section 102 is raised by the deposition of the ink. Alternatively, the image forming section 107 may apply a pressure to a printing medium on which the image data has been printed to raise a region of the printing medium corresponding to the region identified by the region identifying section 102. Alternatively, the image forming section 107 may deposit a foaming ink on a printing medium on which the image data has been printed and cause the foaming ink to expand such that a region of the printing medium corresponding to the region identified by the region identifying section 102 is raised. The image forming section 107 may use the ink-jet printing scheme, the dot-impact printing scheme, or the xerographic method to print the image data. The image forming section 107 may include a printing device such as a laser printer or an ink-jet printer. Alternatively, the image forming section 107 may be implemented by a printing device operated by an information processing apparatus such as a CPU having a specific program loaded thereon.

The image forming section 107 may generate, from the image data obtained by the image obtaining section 101, parallax image data, in other words, right-eye image data and left-eye image data that enable the user to view an image in which the region identified by the region identifying section 102 is raised. The image forming section 107 may display the generated right-eye image data and left-eye image data so that the right-eye image data is viewed by the right eye of the user and the left-eye image data is viewed by the left eye of the user. By viewing such parallax image data, the user can see an image in which the region identified by the region identifying section 102 is raised. To sum up, the image forming section 107 may form an image in which a specific region is physically raised or image data that enables the user to stereoscopically view an image in which a specific region is raised.

Figure 2:
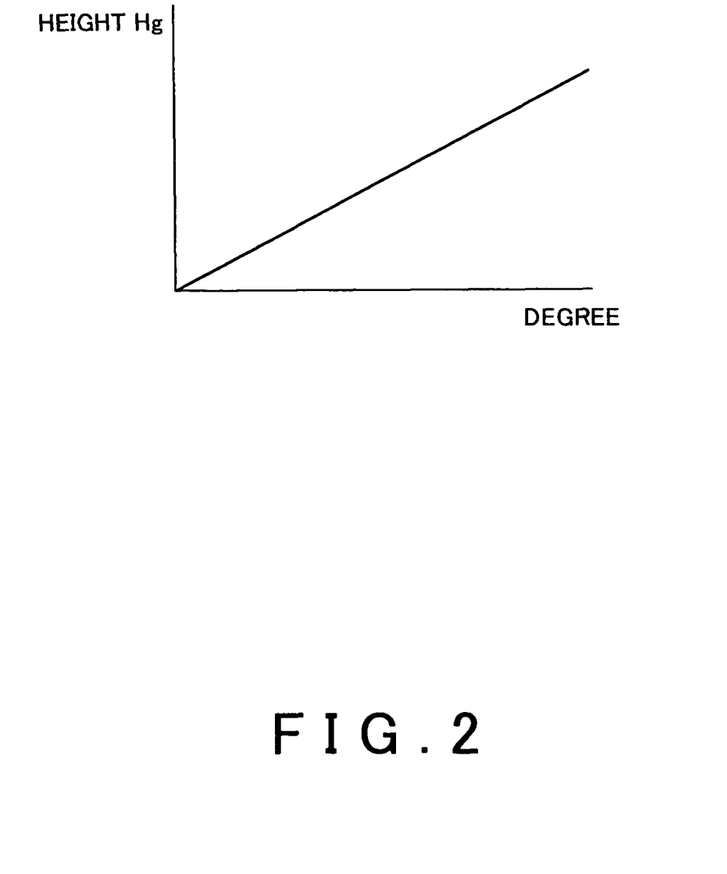
FIG. 2 is a graph showing an exemplary relation between a height Hg, which is stored on a conversion parameter storing section 105, and a degree of gray level enhancement.

FIG. 2 is a graph showing an exemplary relation between a height Hg, which is stored on the conversion parameter storing section 105, and the degree of the gray level enhancement. The horizontal axis represents the degree, which is oriented from left to right. The vertical axis represents the height Hg. As seen from FIG. 2, the height Hg increases as the degree of the gray level enhancement increases. Also as seen from FIG. 2, the height Hg increases in proportion to the degree of the gray level enhancement. Here, the relation between the height Hg and the degree of the gray level enhancement is not limited to that shown in FIG. 2, and may be represented by a quadratic curve, for example. The conversion parameter adjusting section 106 can change the weights assigned to the degrees of the gray level, enhancement by changing the heights Hg stored in association with the degrees of the gray level enhancement. Stated differently, the conversion parameter adjusting section 106 changes the weights assigned to the degrees of the gray level enhancement by changing, for example, the slope of the line shown in the graph.

Figure 3:
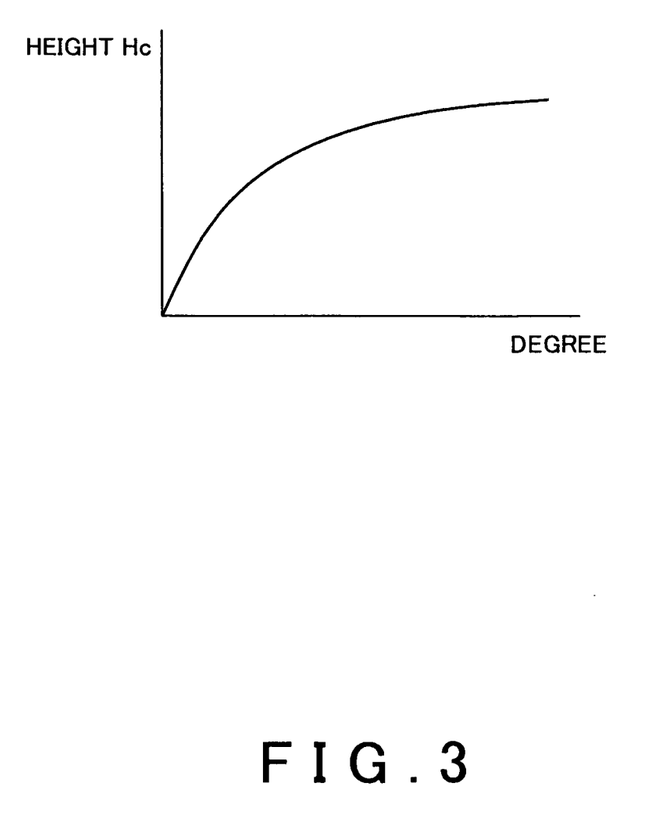
FIG. 3 is a graph showing an exemplary relation between a height Hc, which is stored on the conversion parameter storing section 105, and a degree of color saturation enhancement.

FIG. 3 is a graph showing an exemplary relation between a height Hc, which is stored on the conversion parameter storing section 105, and the degree of the color saturation enhancement. The horizontal axis represents the degree, which is oriented from left to right. The vertical axis represents the height Hc. As seen from FIG. 3, the height Hc dramatically increases as the degree of the color saturation enhancement increases up to a certain value and moderately increases as the degree of the color saturation enhancement increases after the certain value. The height Hc may be alternatively set to increase in proportion to the degree of the color saturation enhancement. The height Hc may be alternatively set to moderately increase as the degree of the color saturation enhancement increases up to a certain value and dramatically increase as the degree of the color saturation enhancement increases after the certain value. In other words, the relation between the height Hc and the degree of the color saturation enhancement may not be limited to that shown in FIG. 3. The conversion parameter adjusting section 106 can change the weights assigned to the degrees of the color saturation enhancement by changing the heights Hc stored in association with the degrees of the color saturation enhancement. Stated differently, the conversion parameter adjusting section 106 changes the weights assigned to the degrees of the color saturation enhancement by changing the shape of the curve shown in the graph.

Figure 4:
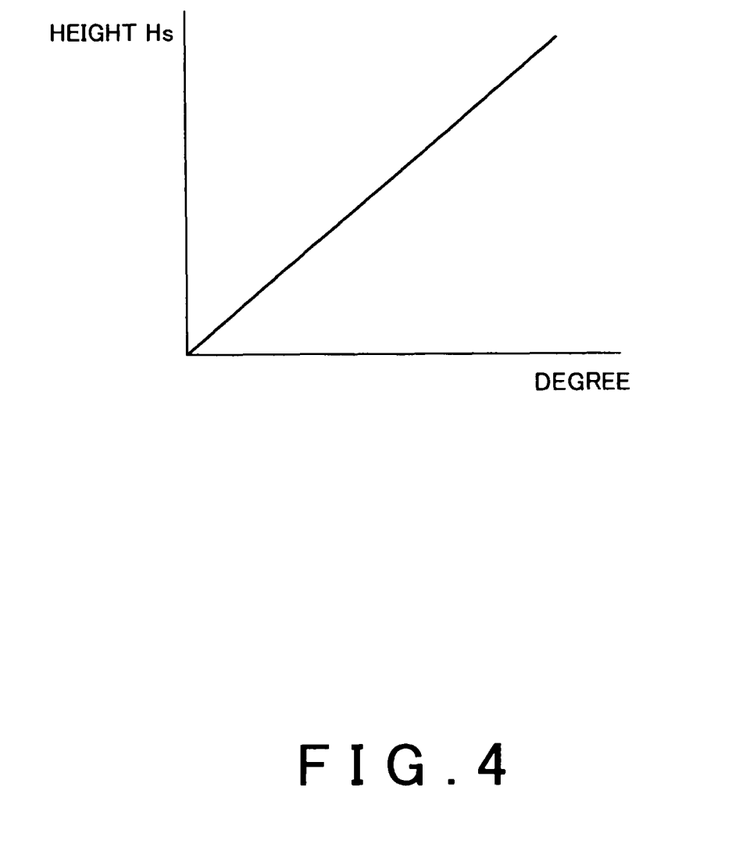
FIG. 4 is a graph showing an exemplary relation between a height Hs, which is stored on the conversion parameter storing section 105, and a degree of sharpness enhancement.

FIG. 4 is a graph showing an exemplary relation between a height Hs, which is stored on the conversion parameter storing section 105, and the degree of the sharpness enhancement. The horizontal axis represents the degree, which is oriented from left to right. The vertical axis represents the height Hs. As seen from FIG. 4, the height Hs increases as the degree of the sharpness enhancement increases. Also as seen from FIG. 4, the height Hs increases in proportion to the degree of the sharpness enhancement. Here, the relation between the height Hs and the degree of the sharpness enhancement is not limited to that shown in FIG. 4, and may be represented by a quadratic curve, for example. The conversion parameter adjusting section 106 can change the weights assigned to the degrees of the sharpness enhancement by changing the heights Hs stored in association with the degrees of the sharpness enhancement. Stated differently, the conversion parameter adjusting section 106 changes the weights assigned to the degrees of the sharpness enhancement by changing, for example, the slope of the line shown in the graph.

Figure 5:
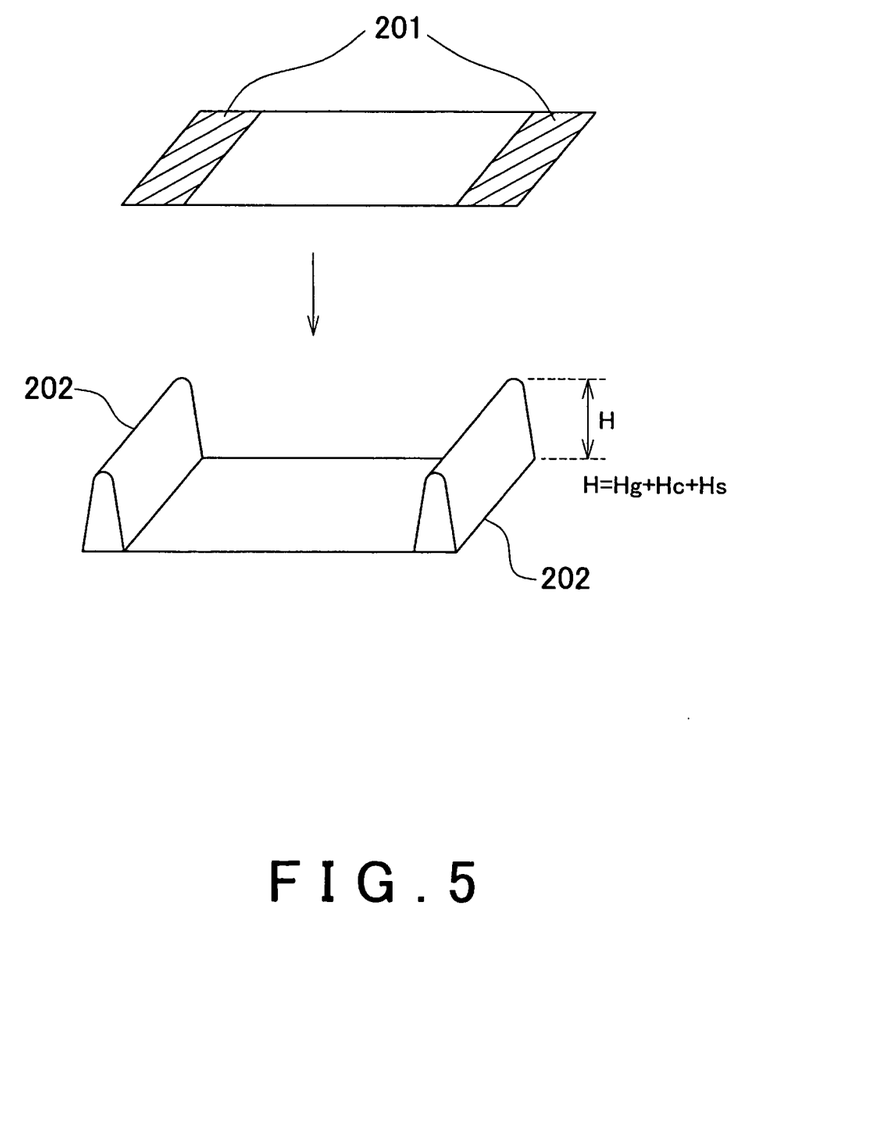
FIG. 5 shows an exemplary printed image in which a region of a printing medium corresponding to a region identified by a region identifying section 102 is raised to a height determined by a height determining section 104.

FIG. 5 shows an exemplary printed image whose a region corresponding to the region identified by the region identifying section 102 is raised to the height determined by the height determining section 104. Specifically speaking, FIG. 5 illustrates an exemplary region identified to be subjected to at least one of the sharpness enhancement, the gray level enhancement, and the color saturation enhancement, and an exemplary printed image whose region corresponding to the identified region is raised. In FIG. 5, a reference numeral 201 represents the region identified to be subjected to the sharpness enhancement, the gray level enhancement, and the color saturation enhancement. Also in FIG. 5, a reference numeral 202 represents how much the region of the printed image corresponding to the identified region is raised. As indicated by the reference numeral 202, the region of the printed image corresponding to the region 201 is raised to a height H equal to the sum of the height Hg associated with the degree of the gray level enhancement, the height Hc associated with the degree of the color saturation enhancement, and the height Hs associated with the degree of the sharpness enhancement. As shown in FIG. 5, when the region identifying section 102 identifies a region to be subjected to a plurality of types of enhancement, a region of a printing medium corresponding to the identified region is raised to a height obtained by adding together the heights associated with the degrees of the plurality of types of enhancement. By adding together heights associated with degrees of a plurality of types of enhancement, the image forming apparatus 100 can produce a more excellent three-dimensional image.

As described above, the image forming apparatus 100 can easily produce a three-dimensional image by raising a region that is identified to be subjected to enhancement. Being saved from the process of measuring the distances to the subjects, the image forming apparatus 100 can be constituted without a distance measuring sensor and the like, thereby producing an excellent three-dimensional image at a reduced cost. Furthermore, the image forming apparatus 100 can also easily produce a three-dimensional image from image data without any information on the distances to the subjects. The region identifying section 102, the degree determining section 103, and the height determining section 104 may be implemented by electric or electronic circuits or by information processing apparatuses such as CPUs having programs loaded thereto. The image obtaining section 101 and the conversion parameter storing section 105 have media for at least storing or recording data, and the conversion parameter adjusting section 106 may be implemented by an information processing apparatus such as a CPU and user manipulation keys. The image forming apparatus 100 may be implemented by an information processing apparatus such as a CPU having a specific program loaded thereto. Alternatively, the image forming apparatus 100 may include a recording medium storing thereon a specific program.

The above-described embodiment may be modified in the following manner.

(1) The region identifying section 102 only identifies a region to be subjected to the sharpness enhancement. In this modification example, it may be judged whether the identified region is to be subjected to the gray level enhancement.

Also, it may be judged whether the identified region is to be subjected to the color saturation enhancement. When the identified region is judged to be subjected to neither the gray level enhancement nor the color saturation enhancement, the height determining section 104 may determine the height Hs in association with the degree of the sharpness enhancement and the image forming section 107 may form an image whose region corresponding to the identified region is raised to the determined height Hs. On the other hand, when the identified region is judged to be subjected to at least one of the gray level enhancement and the color saturation enhancement, the height determining section 104 determines the height to which a region of an image corresponding to the identified region is to be raised, based on the height associated with the degree of the type of the enhancement that is to be performed and the height Hs associated with the degree of the sharpness enhancement, and the image forming section 107 forms the image whose region corresponding to the identified region is raised to the determined height.

(2) In the above-described embodiment, the height determining section 104 is configured to change the height according to the degree of the enhancement, but may select a fixed height irrespective of the degree. In this modification example, the height determining section 104 may select different fixed heights depending on the types of the enhancement. When a single region is to be subjected to a plurality of types of enhancement, the height determining section 104 may add together the fixed heights associated with the respective types of enhancement, or select the fixed height associated with one of the types of enhancement.

(3) The image forming apparatus 100 may additionally include an image processing section, which performs the sharpness enhancement, the gray level enhancement, the color saturation enhancement on the image data obtained by the image obtaining section 101. In this modification example, the region identifying section 102 and the degree determining section 103 may obtain, from the image processing section, the region that has been subjected to the enhancement and the degree of the enhancement. In this modification example, the image forming section 107 may form an image from the image data that is obtained by the image obtaining section 101 and has not been subjected to image processing, or from the image data that has been subjected to the image processing by the image processing section. Here, the expression "forming the image" means both "printing the image data" and "processing the image data to generate parallax image data to be displayed."

(4) The region identifying section 102 may identify the entire region of the image data. Alternatively, the region identifying section 102 may not be provided in the image forming apparatus 100. In this modification example, the degree determining section 103 determines the degree of the enhancement to be performed on every one of the regions of the image data. Thus, the degree determining section 103 selects a degree of "0" for a region that will not be subjected to the enhancement. The height determining section 104 may determine the height for each region, in accordance with the degree of the enhancement to be performed on the region. Here, the height determining section 104 selects a height of "0" for the region for which the degree of the enhancement is set at "0."

(5) The above-described modification examples (1) to (4) may be freely combined.

Although some aspects of the present invention have been described by way of exemplary embodiments, it should be understood that those skilled in the art might make many changes and substitutions without departing from the spirit and the scope of the present invention which is defined only by the appended claims.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. An image forming apparatus comprising:
an image obtaining section that obtains a source image;
a region identifying section that identifies a region, in the source image, that is to be subjected to an image processing enhancement including one or more of sharpness enhancement, gray level enhancement, and color saturation enhancement; and
an image forming section that forms an image whose region corresponding to the region identified by the region identifying section is raised based on the image processing enhancement,
wherein the image forming section forms the image such that the corresponding region is raised in accordance with a degree of the image processing enhancement.

2. The image forming apparatus as set forth in claim 1, wherein
the image forming section adjusts an amount of ink used to print the image on the printing medium so that the region of the printing medium corresponding to the region identified by the region identifying section is raised by the ink.

3. The image forming apparatus as set forth in claim 1, wherein
the image forming section first prints the image on a printing medium and then applies a pressure to a region of the printing medium corresponding to the region identified by the region identifying section to raise the corresponding region of the printing medium.

4. The image forming apparatus as set forth in claim 1, wherein
the image forming section generates, from the source image, parallax image data that enables a viewer to view the image whose region corresponding to the region identified by the region identifying section is raised.

5. A non-transitory computer readable medium storing thereon a program which when executed causes a computer to function as an image forming apparatus comprising:
an image obtaining section that obtains a source image;
a region identifying section that identifies a region, in the source image, that is to be subjected to an image processing enhancement including one or more of sharpness enhancement, gray level enhancement, and color saturation enhancement; and
an image forming section that forms an image whose region corresponding to the region identified by the region identifying section is raised based on the image processing enhancement,
wherein the image forming section forms the image such that the corresponding region is raised in accordance with a degree of the image processing enhancement.

6. The non-transitory computer readable medium as set forth in claim 5, wherein the image forming section adjusts an amount of ink used to print the image on the printing medium so that the region of the printing medium corresponding to the region identified by the region identifying section is raised by the ink.

7. A method of outputting an image from a computer, comprising:
- obtaining a source image;
- identifying, in the source image, a region to be subjected to an image processing enhancement including one or more of sharpness enhancement, gray level enhancement, and color saturation enhancement; and
- forming the image whose region corresponding to the identified region is raised based on the image processing enhancement,
- wherein the forming includes forming the image such that the corresponding region is raised in accordance with a degree of the image processing enhancement.

8. The method of outputting an image from a computer as set forth in claim 7, wherein the forming step includes adjusting an amount of ink used to print the image on the printing medium so that the region of the printing medium corresponding to the region identified by the region identifying step is raised by the ink.

* * * * *